United States Patent
Fang et al.

(10) Patent No.: US 11,009,713 B1
(45) Date of Patent: May 18, 2021

(54) HEAD-MOUNTED DISPLAY DEVICE WITH VOICE COIL MOTORS FOR MOVING DISPLAYS

(71) Applicant: Facebook Technologies, LLC, Menlo Park, CA (US)

(72) Inventors: Joyce Fang, Redmond, WA (US); Nicholas Colonnese, Kirkland, WA (US); Bruce A. Cleary, Bothell, WA (US); Ryan Michael Ebert, Issaquah, WA (US); Douglas Robert Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/530,893

(22) Filed: Aug. 2, 2019

Related U.S. Application Data

(60) Provisional application No. 62/804,717, filed on Feb. 12, 2019, provisional application No. 62/778,842, filed on Dec. 12, 2018.

(51) Int. Cl.
  *G02B 27/01* (2006.01)
  *G02B 7/08* (2021.01)
  *G06F 3/01* (2006.01)

(52) U.S. Cl.
  CPC ......... *G02B 27/0176* (2013.01); *G02B 7/08* (2013.01); *G02B 27/0172* (2013.01); *G06F 3/012* (2013.01); *G06F 3/013* (2013.01)

(58) Field of Classification Search
  CPC .. G02B 27/0176; G02B 7/08; G02B 27/0172; G06F 3/012; G06F 3/013
  See application file for complete search history.

(56) References Cited

U.S. PATENT DOCUMENTS

| | | | | |
|---|---|---|---|---|
| 5,880,711 A | * | 3/1999 | Tamada | G02B 26/0883 345/619 |
| 2013/0169683 A1 | * | 7/2013 | Perez | G06F 3/013 345/633 |

(Continued)

OTHER PUBLICATIONS

Fang, Office Action, U.S. Appl. No. 16/530,896, dated Jun. 2, 2020, 22 pgs.

(Continued)

*Primary Examiner* — Chanh D Nguyen
*Assistant Examiner* — Ngan T. Pham-Lu
(74) *Attorney, Agent, or Firm* — Morgan, Lewis & Bockius LLP

(57) ABSTRACT

A head mounted display (HMD) includes a set of one or more lenses defining an optical axis, a display configured to project light through the set of the one or more lenses, a voice coil actuator coupled with the display and configured to move the display along the optical axis, and a first guide that is slidingly coupled with the first voice coil actuator to guide the movement of the first display. The HMD additionally includes a set of one or more position sensors configured to determine a position of the display long the optical axis and an electronic controller configured to receive information identifying a reference position of the display along the optical axis and generate one or more electrical signals for initiating a movement of the first display toward the first reference point along the optical axis.

18 Claims, 14 Drawing Sheets

(56) References Cited

U.S. PATENT DOCUMENTS

2013/0208193 A1\* 8/2013 Wyllie .................. G06F 1/1601
348/836
2017/0148215 A1\* 5/2017 Aksoy ..................... G06F 3/013
2017/0160798 A1 6/2017 Lanman et al.
2019/0282434 A1 9/2019 Park

OTHER PUBLICATIONS

Fang, Notice of Allowance, U.S. Appl. No. 16/530,896, dated Aug. 11, 2020, 7 pgs.

\* cited by examiner (Frame n)

(Frame n+1)

Frame n+1

Frame n+2

800

At a first electronic controller for use in a head-mounted display device, the head-mounted display having a first set of one or more lenses defining a first optical axis, a first display, a first voice coil actuator coupled with the first display, a first voice coil actuator, a first guide, a first set of one or more position sensors configured to determine a position of the first display, and the first electronic controller: 802

Receive, at the first electronic controller, information identifying a first reference position of a first display along a first optical axis 804

> Determine the first reference position based on information identifying a position of an eye of a user determined by an eye tracking system and provide the first reference position to the first electronic controller 806

Receive, at the first electronic controller, information identifying a determined position of the first display along the first optical axis 808

Generate, with the first electronic controller, one or more electrical signals for initiating a movement of the first display toward the first reference position along the first optical axis 810

> Generate a first electrical signal that is based on a difference between the first reference position along the first optical axis and the determined position of the first display along the first optical axis 812

>> Generate one or more electrical signals that are based on a derivative value corresponding to the difference between the first reference position along the first optical axis and the determined position of the first display along the first optical axis and/or an integral value corresponding to the difference between the first reference position along the first optical axis and the determined position of the first display along the first optical axis 814

>> Generate a second electrical signal by adding to the first electrical signal a predefined amount of signal based on a sign of the first electrical signal 816

>> The first voice coil actuator includes a coil and a magnet. Generate a third electrical signal that is based on (i) the difference between the first reference position along the first optical axis and the determined position of the first display along the optical axis and (ii) a position of the coil relative to the magnet 818

>> Generate a fourth electrical signal by limiting the first electrical signal and/or limiting a rate of change of the first electrical signal 820

>> Generate a fifth electrical signal by adding to the first signal an electrical signal based on an acceleration of the head-mounted display determined by one or more inertial measurement units of the head-mounted display 822

Repeat, with the first electronic controller, (i) receiving the information identifying a determined position of the first display along the first optical axis and (ii) providing electrical signals to continue the movement of the first display until the determined position is within a predefined distance from the first reference position 824

Smooth, via a filter that is electrically coupled to the first set of one or more position sensors and the first controller, electrical signals representing the determined position of the first display along the first optical axis 826

Figure 8B

HEAD-MOUNTED DISPLAY DEVICE WITH VOICE COIL MOTORS FOR MOVING DISPLAYS

RELATED APPLICATIONS

This application claims the benefit of, and priority to, U.S. Provisional Patent Application 62/778,842, entitled "Head-Mounted Display Device with Voice Coil Motors for Moving Displays" filed Dec. 12, 2018 and U.S. Provisional Patent Application 62/804,717, entitled "Head-Mounted Display Device with Voice Coil Motors for Moving Displays" filed Feb. 12, 2019, both of which are incorporated by reference herein in their entireties. This application is related to U.S. patent application Ser. No. 16/530,892, entitled "Head-Mounted Display Device with Voice Coil Motors for Moving Displays" filed Aug. 2, 2019, U.S. patent application Ser. No. 16/530,890, entitled "Head-Mounted Display Device with Stepper Motors for Moving Displays" filed Aug. 2, 2019, and U.S. patent application Ser. No. 16/530,896, entitled "Head-Mounted Display Device with Direct-Current (DC) Motors for Moving Displays" filed Aug. 2, 2019, all of which are incorporated by reference herein in their entireties.

TECHNICAL FIELD

The present disclosure generally relates to enhancing head-mounted display devices, and specifically to an actuator (e.g., a voice coil motor) for adjusting a focal plane of projected images and control methods for the actuator.

BACKGROUND

A head mounted display (HMD) can be used to simulate virtual environments. For example, stereoscopic images are displayed on a display inside the HMD to simulate the illusion of depth, and head tracking sensors estimate what portion of the virtual environment is being viewed by the user. However, conventional HMDs are often unable to compensate for vergence and accommodation conflicts when rendering content, which may cause visual fatigue and nausea in users.

SUMMARY

One solution to the problem includes providing a head-mounted display device that uses one or more voice coil motors to move one or more displays of the head-mounted display device. By moving the one or more displays, focal planes are adjusted, thereby reducing, alleviating, or eliminating the vergence and accommodation conflicts. The one or more voice coil motors are capable of moving the displays rapidly and quietly, thereby enhancing the user experience with the simulated virtual (or augmented) environment.

In accordance with some embodiments, a head mounted display (HMD, also called herein a headset) includes a set of one or more lenses defining an optical axis, a display configured to project light through the set of one or more lenses, a voice coil actuator coupled with the display and configured to move the display along the optical axis, a guide that is slidingly coupled to the voice coil actuator to guide the movement of the display, a set of one or more position sensors configured to determine a position of the display along the optical axis, and an electronic controller configured to receive information identifying a reference position of the display along the optical axis, receive information identifying the determined position of the display along the optical axis, and generate one or more electrical signals for initiating a movement of the display toward the reference position along the optical axis.

In accordance with some embodiments, a method performed at a first electronic controller of a head-mounted display device includes receiving information identifying a first reference position of a first display of a head-mounted display device along a first optical axis. The method also includes receiving information identifying a determined position of the first display along the first optical axis and generating one or more electrical signals for initiating a movement of the first display toward the first reference position along the first optical axis.

In accordance with some embodiments, a first electronic controller includes means for receiving information identifying a first reference position of a first display of a head-mounted display device along a first optical axis. The first electronic controller additionally includes means for receiving information identifying a determined position of the first display along the first optical axis and means for generating one or more electrical signals for initiating a movement of the first display toward the first reference position along the first optical axis.

In accordance with some embodiments, a head-mounted display device includes one or more processors/cores and memory storing one or more programs configured to be executed by the one or more processors/cores. The one or more programs include instructions for performing the operations of any of the methods described herein. In accordance with some embodiments, a non-transitory computer-readable storage medium stores therein instructions that, when executed by one or more processors/cores of a head-mounted display device, cause the device to perform the operations of any of the methods described herein.

In another aspect, a head-mounted display device is provided and the head-mounted display device includes means for performing any of the methods described herein.

Thus, the disclosed embodiments provide a head-mounted display device with at least one voice coil motor to move a display of the head-mounted display device.

BRIEF DESCRIPTION OF DRAWINGS

For a better understanding of the various described embodiments, reference should be made to the Description of Embodiments below, in conjunction with the following drawings in which like reference numerals refer to corresponding parts throughout the figures and specification.

FIGS. 8A-8B are flow diagrams showing a method of adjusting positions of an electronic display in accordance with some embodiments.

Figure 1:
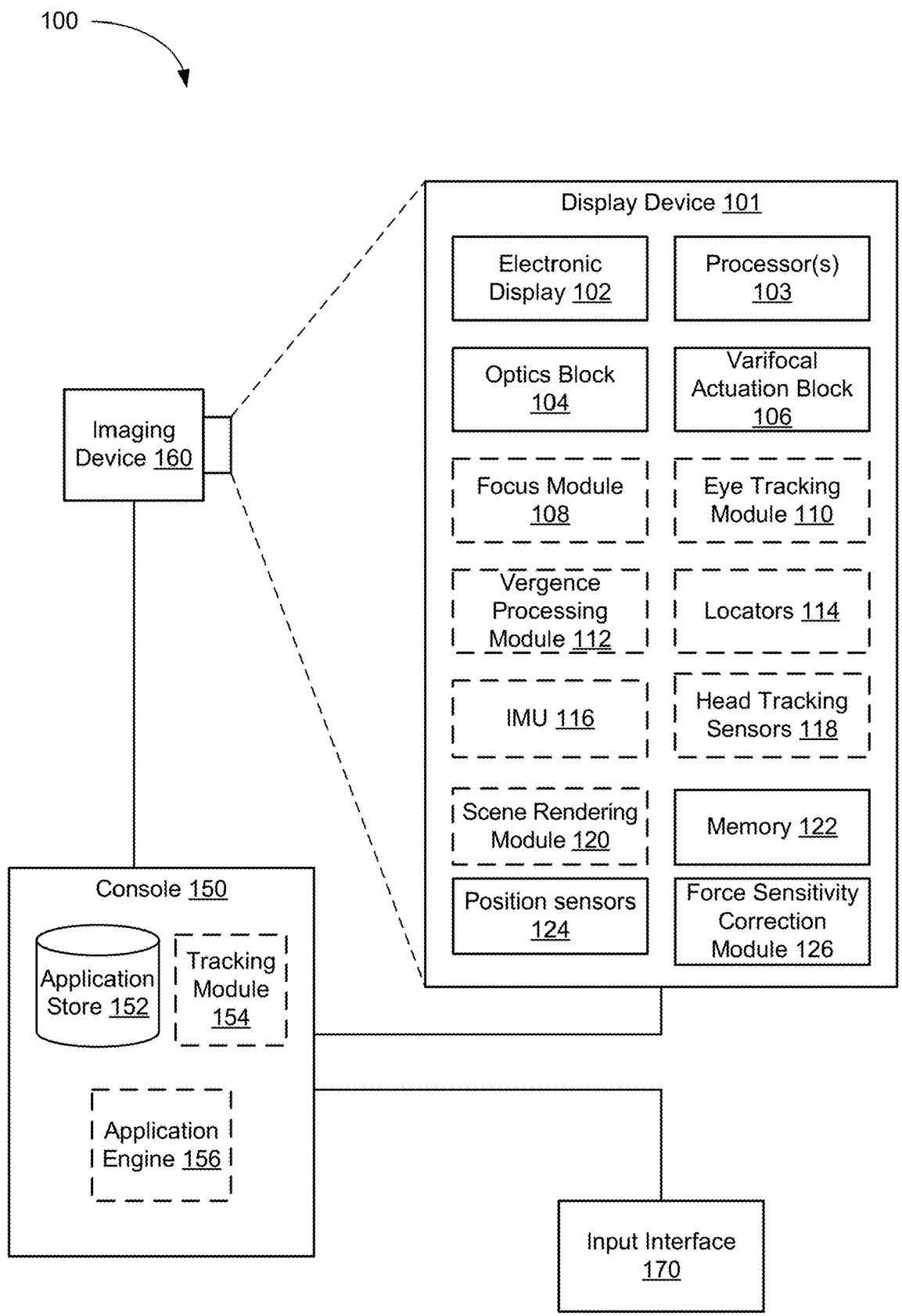
FIG. 1 is a block diagram illustrating an example system in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first voice coil motor could be termed a second voice coil motor, and, similarly, a second voice coil motor could be termed a first voice coil motor, without departing from the scope of the various described embodiments. The first voice coil motor and the second voice coil motor are both voice coil motors, but they are not the same voice coil motor, unless specified otherwise. It is additionally noted that the terms "voice coil motor" and "voice coil actuator" are used here interchangeably.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

A varifocal system provides dynamic adjustment of a focal plane of a head-mounted display device to keep a user's eyes in a zone of comfort as vergence and accommodation change. In some embodiments, the system uses an eye tracker to determine a gaze direction of the user and moves one or more optical components (e.g., a lens and/or an electronic display) to ensure that the displayed image is located at a focal plane that corresponds to the determined gaze direction. The system, in some embodiments, physically moves an electronic display, an optical block, or both using various actuation devices, control system, and position sensing mechanisms described herein.

FIG. 1 is a block diagram illustrating system 100 in accordance with some embodiments. System 100 shown in FIG. 1 includes display device 101, imaging device 160, and input interface 170. In some embodiments, all of display device 101, imaging device 160, and input interface 170 are coupled to console 150.

Embodiments of system 100 may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

While FIG. 1 shows single display device 101, single imaging device 160, and single input interface 170, in some other embodiments, any number of these components may be included in the system. For example, there may be multiple display devices each having associated input interface 170 and being monitored by one or more imaging devices 160, with each display device 101, input interface 170, and imaging device 160 communicating with console 150. In alternative configurations, different and/or additional components may also be included in the system environment.

In some embodiments, display device 101 is a head-mounted display that presents media to a user of display device 101. Display device 101 is also referred to herein as a head-mounted display device. Examples of media presented by display device 101 include one or more images, video, audio, or some combination thereof. In some embodiments, audio is presented via an external device (e.g., speakers and/or headphones) that receives audio information from display device 101, console 150, or both, and presents audio data based on the audio information. In some embodiments, display device 101 immerses a user in a virtual environment.

In some embodiments, display device 101 also acts as an augmented reality (AR) headset. In these embodiments, display device 101 augments views of a physical, real-world environment with computer-generated elements (e.g., images, video, sound, etc.). Moreover, in some embodiments, display device 101 is able to cycle between different types of operation. Thus, display device 101 operates as a virtual reality (VR) device, an AR device, as glasses or some combination thereof (e.g., glasses with no optical correction, glasses optically corrected for the user, sunglasses, or some combination thereof) based on instructions from application engine 156.

In some embodiments, display device 101 includes one or more of each of the following: display 102, processor 103, optics block 104, varifocal actuation block 106, focus prediction module 108, eye tracking module 110, vergence processing module 112, locators 114, inertial measurement unit 116, head tracking sensors 118, scene rendering module 120, and memory 122. In some embodiments, display device 101 includes only a subset of the modules described here. In some embodiments, display device 101 has different modules than those described here. Similarly, the functions can be distributed among the modules in a different manner than is described here.

One or more processors 103 (e.g., processing units or cores) execute instructions stored in memory 122. Memory 122 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 122, or alternately the non-volatile memory device(s) within memory 122, includes a non-transitory computer readable storage medium. In some embodiments, memory 122 or the computer readable storage medium of memory 122 stores programs, modules and data structures, and/or instructions for displaying one or more images on display 102.

Display 102 displays images to the user in accordance with data received from console 150 and/or processor(s) 103. In various embodiments, display 102 comprises a single adjustable display element or multiple adjustable displays elements (e.g., a display for each eye of a user).

Optics block 104 directs light from display 102 to an exit pupil, for viewing by a user, using one or more optical elements, such as Fresnel lenses, convex lenses, concave lenses, filters, and so forth, and may include combinations of different optical elements. Optics block 104 typically includes one or more lenses. In some embodiments, when display 102 includes multiple adjustable display elements, optics block 104 may include multiple optics blocks 104 (one for each adjustable display element).

Optics block 104 may be designed to correct one or more optical errors. Examples of optical errors include: barrel distortion, pincushion distortion, longitudinal chromatic aberration, transverse chromatic aberration, spherical aberration, comatic aberration, field curvature, astigmatism, and so forth. In some embodiments, content provided to display 102 for display is pre-distorted, and optics block 104 corrects the distortion when it receives image light from display 102 generated based on the content.

Varifocal actuation block 106 is configured to move display 102 and/or components of optics block 104 to vary the focal plane of display device 101. In doing so, varifocal actuation block 106 keeps a user's eyes in a zone of comfort as vergence and accommodation change. In some embodiments, varifocal actuation block 106 physically changes the distance between display 102 and optics block 104 by moving display 102 or optics block 104 (or both), as will be explained further with respect to FIGS. 4C-4D. Additionally, moving or translating two lenses of optics block 104 relative to each other may also be used to change the focal plane of display device 101. Thus, varifocal actuation block 106 may include actuators or motors (e.g., a voice coil motor) that are configured to move display 102 and/or optics block 104 to change the distance between them. Varifocal actuation block 106 may be separate from or integrated into optics block 104 in various embodiments.

Each state of optics block 104 corresponds to a particular location of a focal plane of display device 101. In some embodiments, optics block 104 moves in a range of 5~10 mm with a positional accuracy of 5~10 μm. This can lead to 1000 states (e.g., positions) of optics block 104. Any number of states could be provided. In some embodiments, fewer states are used. For example, in some cases, a first state corresponds to a focal plane located at infinity, a second state corresponds to a focal plane located at 2.0 meters (from a reference plane), a third state corresponds to a focal plane located at 1.0 meter, a fourth state corresponds to a focal plane located at 0.5 meter, a fifth state corresponds to a focal plane located at 0.333 meter, and a sixth state corresponds to a focal plane located at 0.250 meter. Varifocal actuation block 106, thus, sets and changes the state of optics block 104 to achieve a desired location of a focal plane.

Optional focus prediction module 108 includes logic that tracks the position or state of optics block 104 and/or display 102 to predict one or more future states or locations of optics block 104 and/or display 102. In some embodiments, focus prediction module 108 accumulates historical information corresponding to previous states of optics block 104 and predicts a future state of optics block 104 based on the previous states. Rendering of a virtual scene by display device 101 is adjusted, at least in some embodiments, based on the state of optics block 104, the predicted state allows scene rendering module 120 to determine an adjustment to apply to the virtual scene for a particular frame.

Optional eye tracking module 110 tracks an eye position and/or eye movement of a user of display device 101. In some embodiments, a camera or other optical sensor (typically located inside display device 101) captures image information of a user's eyes, and eye tracking module 110 uses the captured information to determine interpupillary distance, interocular distance, a three-dimensional (3D) position of each eye relative to display device 101 (e.g., for distortion adjustment purposes), including a magnitude of torsion and rotation (i.e., roll, pitch, and yaw) and gaze directions for each eye. In one example, infrared light is emitted within display device 101 and reflected from each eye. The reflected light is received or detected by the camera and analyzed to extract eye rotation information from changes in the infrared light reflected by each eye. Many methods for tracking the eyes of a user can be used by eye tracking module 110. Accordingly, eye tracking module 110 may track up to six degrees of freedom of each eye (e.g., three-dimensional position, roll, pitch, and yaw) and at least a subset of the tracked quantities may be combined from two eyes of a user to estimate a gaze point (e.g., a three-dimensional location or position in the virtual scene where the user is looking).

Optional vergence processing module 112 determines a vergence depth of a user's gaze based on the gaze point or an intersection of gaze lines determined by eye tracking module 110. Vergence is the simultaneous movement or rotation of both eyes in opposite directions to maintain single binocular vision, which is naturally and automatically performed by the human eye. Thus, a location where gaze directions of a user's eyes intersect each other is where the user is looking. The gaze location is typically located on a focal plane of the user's eyes (e.g., the plane where the user's eyes are, or should be, focused). In some embodiments, vergence processing module 112 triangulates gaze lines (that correspond to the gaze directions of the user's eyes) to determine a vergence distance or depth from the user. The depth associated with intersection of the gaze lines can then be used as an approximation for the accommodation distance, which identifies a distance from the user where the user's eyes are (or should be) focused. Thus, the vergence distance allows determination of a location where the user's eyes should be focused (and a distance from the user's eyes to the determined location), thereby providing information, such as a location of an object or a focal plane, used for adjusting the virtual scene.

Optional locators 114 are objects located in specific positions on display device 101 relative to one another and relative to a specific reference point on display device 101. Locator 114 may be a light emitting diode (LED), a corner cube reflector, a reflective marker, a type of light source that contrasts with an environment in which display device 101 operates, or some combination thereof. In some embodiments, locators 114 include active locators (e.g., an LED or other type of light emitting device) configured to emit light in the visible band (e.g., about 400 nm to 750 nm), in the infrared (IR) band (e.g., about 750 nm to 1 mm), in the ultraviolet band (e.g., about 100 nm to 400 nm), some other portion of the electromagnetic spectrum, or some combination thereof.

In some embodiments, locators 114 are located beneath an outer surface of display device 101, which is transparent to the wavelengths of light emitted or reflected by locators 114 or is thin enough to not substantially attenuate the wavelengths of light emitted or reflected by locators 114. Additionally, in some embodiments, the outer surface or other portions of display device 101 are opaque in the visible band of wavelengths of light. Thus, locators 114 may emit light in the IR band under an outer surface that is transparent in the IR band but opaque in the visible band.

Optional inertial measurement unit (IMU) 116 is an electronic device that generates first calibration data based on measurement signals received from one or more head tracking sensors 118. One or more head tracking sensors 118 generate one or more measurement signals in response to motion of display device 101. Examples of head tracking sensors 118 include accelerometers, gyroscopes, magnetometers, other sensors suitable for detecting motion, correcting error associated with IMU 116, or some combination thereof. Head tracking sensors 118 may be located external to IMU 116, internal to IMU 116, or some combination thereof.

Based on the measurement signals from head tracking sensors 118, IMU 116 generates first calibration data indicating an estimated position of display device 101 relative to an initial position of display device 101. For example, head tracking sensors 118 include multiple accelerometers to measure translational motion (forward/back, up/down, left/right) and multiple gyroscopes to measure rotational motion (e.g., pitch, yaw, and roll). IMU 116 can, for example, rapidly sample the measurement signals and calculate the estimated position of display device 101 from the sampled data. For example, IMU 116 integrates the measurement signals received from the accelerometers over time to estimate a velocity vector and integrates the velocity vector over time to determine an estimated position of a reference point on display device 101. Alternatively, IMU 116 provides the sampled measurement signals to console 150, which determines the first calibration data. The reference point is a point that may be used to describe the position of display device 101. While the reference point may generally be defined as a point in space; however, in practice the reference point is defined as a point within display device 101 (e.g., a center of IMU 116).

In some embodiments, IMU 116 receives one or more calibration parameters from console 150. As further discussed below, the one or more calibration parameters are used to maintain tracking of display device 101. Based on a received calibration parameter, IMU 116 may adjust one or more IMU parameters (e.g., sample rate). In some embodiments, certain calibration parameters cause IMU 116 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Optional scene rendering module 120 receives content for the virtual scene from application engine 156 and provides the content for display on display 102. Additionally, scene rendering module 120 can adjust the content based on information from focus prediction module 108, vergence processing module 112, IMU 116, and/or head tracking sensors 118. For example, upon receiving the content from engine 156, scene rendering module 120 adjusts the content based on the predicted state (e.g., a state that corresponds to a particular eye position) of optics block 104 received from focus prediction module 108 by adding a correction or pre-distortion into rendering of the virtual scene to compensate or correct for the distortion caused by the predicted state of optics block 104. Scene render module 120 may also add depth of field blur based on the user's gaze, vergence depth (or accommodation depth) received from vergence processing module 112, or measured properties of the user's eye (e.g., three-dimensional position of the eye, etc.). Additionally, scene rendering module 120 determines a portion of the content to be displayed on display 102 based on one or more of tracking module 154, head tracking sensors 118, or IMU 116, as described further below.

Imaging device 160 generates second calibration data in accordance with calibration parameters received from console 150. The second calibration data includes one or more images showing observed positions of locators 114 that are detectable by imaging device 160. In some embodiments, imaging device 160 includes one or more cameras, one or more video cameras, other devices capable of capturing images including one or more locators 114, or some combination thereof. Additionally, imaging device 160 may include one or more filters (e.g., for increasing signal to noise ratio). Imaging device 160 is configured to detect light emitted or reflected from locators 114 in a field of view of imaging device 160. In embodiments where locators 114 include passive elements (e.g., a retroreflector), imaging device 160 may include a light source that illuminates some or all of locators 114, which retro-reflect the light towards the light source in imaging device 160. The second calibration data is communicated from imaging device 160 to console 150, and imaging device 160 receives one or more calibration parameters from console 150 to adjust one or more imaging parameters (e.g., focal length, focus, frame rate, ISO, sensor temperature, shutter speed, aperture, etc.).

Input interface 170 is a device that allows a user to send action requests to console 150. An action request is a request to perform a particular action. For example, an action request may be to start or end an application or to perform a particular action within the application. Input interface 170 may include one or more input devices. Example input devices include a keyboard, a mouse, a game controller, or any other suitable device for receiving action requests and communicating the received action requests to console 150. An action request received by input interface 170 is communicated to console 150, which performs an action corresponding to the action request. In some embodiments, input interface 170 may provide haptic feedback to the user in accordance with instructions received from console 150. For example, haptic feedback is provided by input interface 170 when an action request is received, or console 150 communicates instructions to input interface 170 causing input interface 170 to generate haptic feedback when console 150 performs an action.

Console 150 provides media to display device 101 for presentation to the user in accordance with information received from imaging device 160, display device 101, and/or input interface 170. In the example shown in FIG. 1, console 150 includes application store 152, tracking module 154, and engine 156. Some embodiments of console 150 have different or additional modules than those described in conjunction with FIG. 1. Similarly, the functions further described below may be distributed among components of console 150 in a different manner than is described here.

When application store 152 is included in console 150, application store 152 stores one or more applications for execution by console 150. An application is a group of instructions, that, when executed by a processor (e.g., processors 103), is used for generating content for presentation to the user. Content generated by the processor based on an application may be in response to inputs received from the user via movement of display device 101 or input interface 170. Examples of applications include gaming applications, conferencing applications, video playback application, or other suitable applications.

When tracking module 154 is included in console 150, the tracking module 154 calibrates system 100 using one or more calibration parameters and may adjust one or more calibration parameters to reduce error in determination of the position of display device 101. For example, tracking module 154 adjusts the focus of imaging device 160 to obtain a more accurate position for observed locators 114 on display device 101. Moreover, calibration performed by tracking module 154 also accounts for information received from IMU 116. Additionally, if tracking of display device 101 is lost (e.g., imaging device 160 loses line of sight of at least a threshold number of locators 114), tracking module 154 re-calibrates some or all of the system components.

In some embodiments, tracking module 154 tracks the movement of display device 101 using calibration data from imaging device 160. For example, tracking module 154 determines positions of a reference point on display device 101 using observed locators from the calibration data from imaging device 160 and a model of display device 101. In some embodiments, tracking module 154 also determines positions of the reference point on display device 101 using position information from the calibration data from IMU 116 on display device 101. Additionally, in some embodiments, tracking module 154 use portions of the first calibration data, the second calibration data, or some combination thereof, to predict a future location of display device 101. Tracking module 154 provides the estimated or predicted future position of display device 101 to application engine 156.

Application engine 156 executes applications within system 100 and receives position information, acceleration information, velocity information, predicted future positions, or some combination thereof for display device 101 from tracking module 154. Based on the received information, application engine 156 determines content to provide to display device 101 for presentation to the user, such as a virtual scene. For example, if the received information indicates that the user has looked to the left, application engine 156 generates content for display device 101 that mirrors or tracks the user's movement in a virtual environment. Additionally, application engine 156 performs an action within an application executing on console 150 in response to an action request received from input interface 170 and provides feedback to the user that the action was performed. The provided feedback may be visual or audible feedback via display device 101 or haptic feedback via input interface 170.

Figure 2:
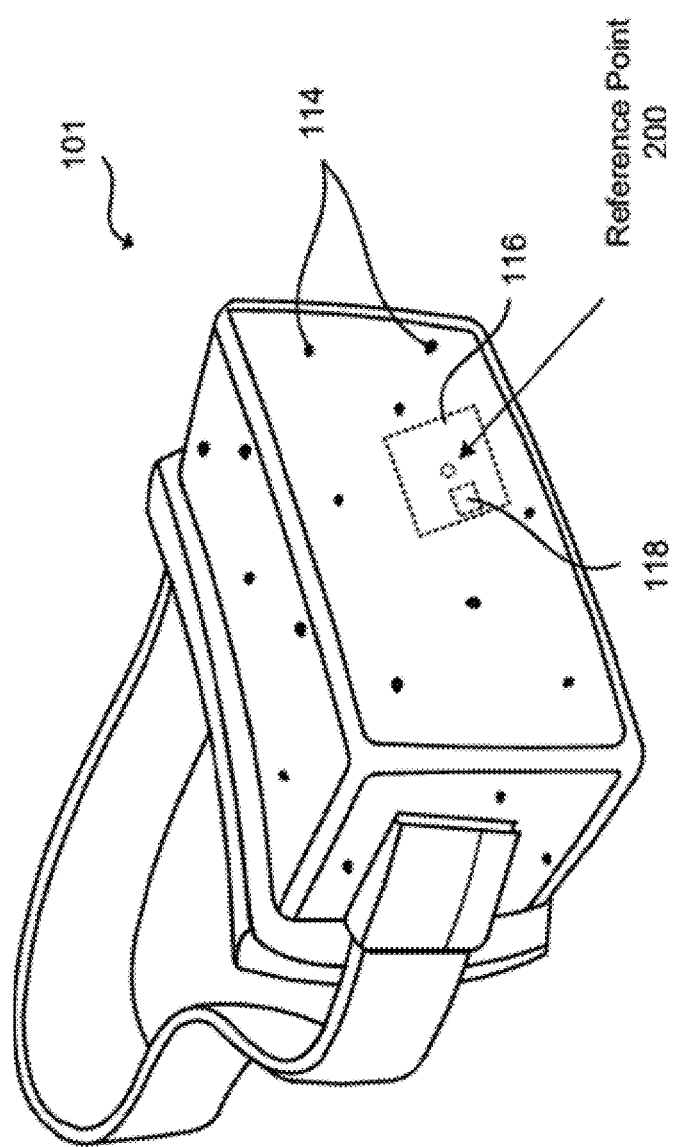
FIG. 2 illustrates a head-mounted display device in accordance with some embodiments.

FIG. 2 illustrates head-mounted display device 101 in accordance with some embodiments. In this example, display device 101 includes a front rigid body and a band that goes around a user's head. The front rigid body includes one or more display elements corresponding to display 102, IMU 116, head tracking sensors 118, and locators 114. In this example, head tracking sensors 118 are located within IMU 116. Note in some embodiments, where the display device 101 is used in AR and/or MR applications, portions of the display device 101 may be at least partially transparent (e.g., an internal display, one or more sides of the display device 101, etc.).

In the example provided, locators 114 are located in fixed positions on the front rigid body relative to one another and relative to reference point 200. In this example, reference point 200 is located at the center of IMU 116. Each of locators 114 emits light that is detectable by imaging device 160. Locators 114, or portions of locators 114, are located on a front side, a top side, a bottom side, a right side, and a left side of the front rigid body, as shown FIG. 2.

Focal Plane Adjustment Method

As discussed above, system 100 may dynamically vary the focal plane to bring images presented to a user wearing display device 101 into focus, which keeps the user's eyes in a zone of comfort as vergence and accommodation change. Additionally, eye tracking in combination with the variable focus of the varifocal system allows blurring to be introduced in images presented by display device 101.

Accordingly, a position, orientation, and/or a movement of display device 101 is determined by a combination of locators 114, IMU 116, head tracking sensors 118, imagining device 160, and tracking module 154, as described above in conjunction with FIG. 1. Portions of a virtual scene presented by display device 101 are mapped to various positions and orientations of display device 101. Thus, a portion of the virtual scene currently viewed by a user is determined based on the position, orientation, and movement of display device 101. After determining the portion of the virtual scene being viewed by the user, the system 100 may then determine a location or an object within the determined portion at which the user is looking to adjust focus for that location or object accordingly.

To determine the location or object within the determined portion of the virtual scene at which the user is looking, display device 101 tracks the position and/or location of the user's eyes. Thus, in some embodiments, display device 101 determines an eye position for each eye of the user. For example, display device 101 tracks at least a subset of the three-dimensional position, roll, pitch, and yaw of each eye and uses these quantities to estimate a three-dimensional gaze point of each eye. Further, information from past eye positions, information describing a position of the user's head, and information describing a scene presented to the user may also be used to estimate the three-dimensional gaze point of an eye in various embodiments.

Figure 3:
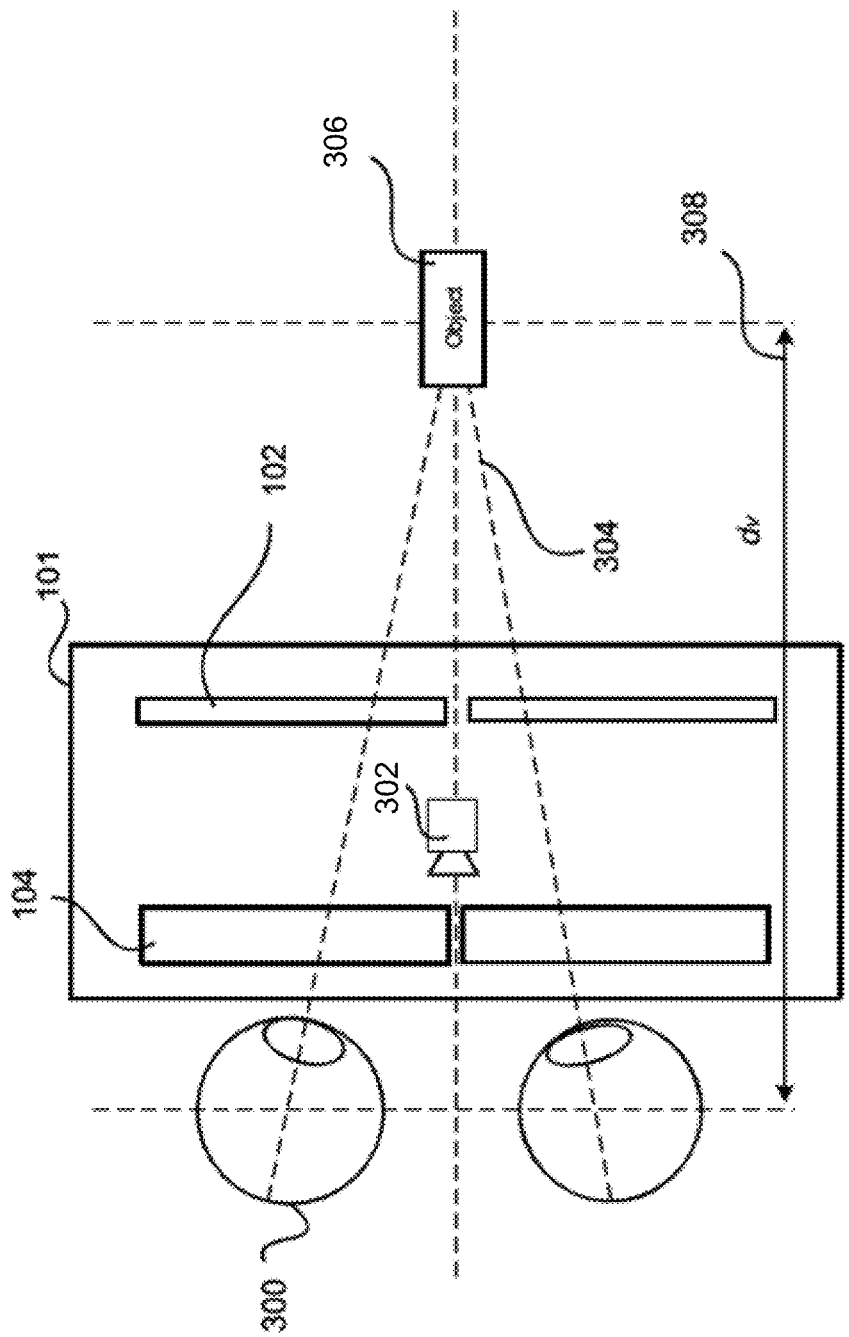
FIG. 3 is a schematic diagram illustrating a head-mounted display device that includes a camera for tracking eye position in accordance with some embodiments.

FIG. 3 is a schematic diagram illustrating display device 101 that includes camera 302 for tracking the position of each eye 300. In this example, camera 302 captures images of the user's eyes and eye tracking module 110 determines, based on the captured images, a position and/or location of each eye 300 and gaze lines 304 corresponding to the gaze point or location where the user is looking.

Vergence depth (dv) 308 of the gaze point for the user is determined based on an estimated intersection of gaze lines 304. In FIG. 3, gaze lines 304 converge or intersect at a location where (real or virtual) object 306 is located. The convergence location is on a plane located at a distance corresponding to vergence depth 308 from eyes 300. Because (virtual) distances from the viewer to (virtual) objects within the virtual scene are known to the system, in some embodiments, vergence depth 308 can be filtered or verified to determine a more accurate vergence depth for the virtual scene. For example, vergence depth 308 is an approximation of the intersection of gaze lines 304, which are themselves an approximation based on the position of a user's eyes 300. Gaze lines 304 do not always precisely intersect each other. Thus, in some embodiments, virtual distances within the virtual scene are compared to the vergence depth for the portion of the virtual scene to generate a filtered vergence depth. In some embodiments, locations, on gaze lines 304, that have the shortest distance to each other are used to determine an estimated vergence depth.

Determining a more accurate vergence depth or gaze point enables the virtual scene to more accurately determine a user's object or plane of focus, allowing scene rendering module 120 to add depth of field blur to objects in the virtual scene or otherwise modify the virtual scene to appear more realistic. Further, if the virtual scene includes multiple objects, vergence processing module 112 may compare the estimated vergence depth to distances associated with at least a subset of the objects to determine accuracy of the estimated vergence depth. In some embodiments, the device selects a particular vergence depth, of the vergence depths corresponding to the displayed objects, that is closest to the estimated vergence depth as a filtered vergence depth; however, other methods of identifying a filtered vergence depth (or an object that corresponds to the filtered vergence depth) may be used in various embodiments.

In some embodiments, a state of optics block 104 is determined for a frame of the virtual scene based on states of optics block 140 during presentation of previous frames of the virtual scene. For example, focus prediction module 108 tracks the state of optics block 104 for various frames of the virtual scene to predict a future state of optics block 104 for subsequent frames of the virtual scene. The predicted state of optics block 104 (e.g., a predicted location of optics block 104) allows the scene rendering module 120 to determine an adjustment to apply to a frame of the virtual scene so that distortion caused by the predicted state of optics block 104 corrects or cancels the applied adjustment rather than distorting the frame. Thus, based on the state of optics block 104, a distortion correction may be determined for application to a frame of the virtual scene to correct optical error introduced by the state of optics block 104.

Accordingly, the focal plane is adjusted for the presented frame of the virtual scene by moving one of display 102 or optics block 104 (or both) to provide the filtered vergence depth. In some embodiments, console 150 receives the necessary information from components and modules of display device 101, and determines where, how far, and how fast to move display 102 and/or optics block 104. Alternatively or additionally, in some embodiments, one or more processors 103 of display device 101 process the information gathered by components and modules of display device 101, and determine where, how far, and how fast to move display 102 and/or optics block 104.

FIGS. 4A-4D show examples of adjusting the focal plane by moving display 102 and/or optics block 104 using varifocal actuation block 106 in accordance with some embodiments. In FIGS. 4A-4D, varifocal actuation block 106 includes an actuator (e.g., motor), track, and so forth that will be further described with respect to FIGS. 5A-10 that allow movement of display 102, optics block 104, or both for dynamically adjusting a focal plane.

Figure 4A:
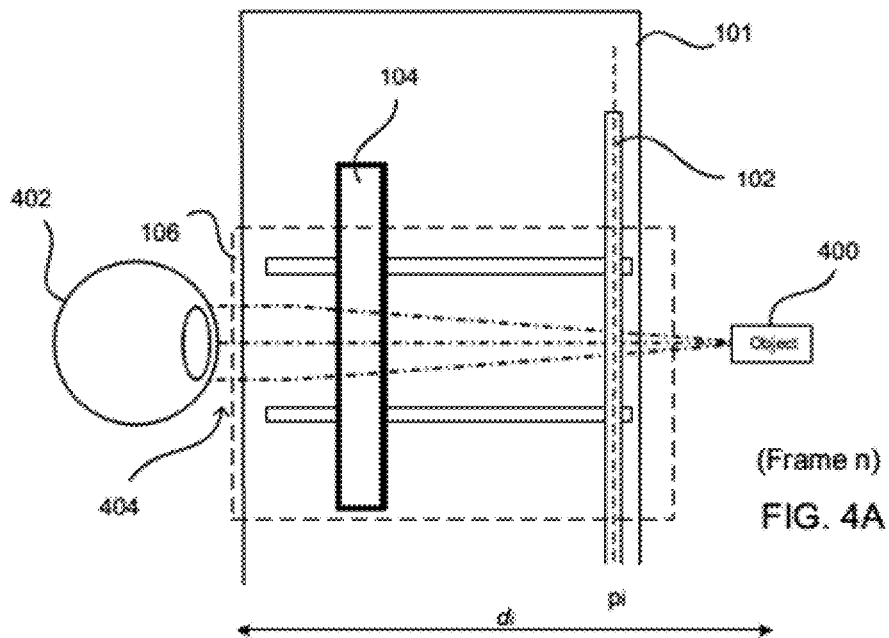
FIGS. 4A-4D show examples of adjusting a focal plane by moving a display screen and/or an optics block using a varifocal actuation block in accordance with some embodiments.

FIG. 4A shows an example of display device 101 providing focal plane adjustment for frame n of a scene. In this example, the scene includes object 400, displayed on display 102, at which the gaze of user 402 is directed (e.g., verged). A virtual image of object 400 is located at a virtual distance $d_i$, behind display 102, from exit pupil 404. In the example of FIG. 4A, display 102 is in position $p_i$, which provides accommodation for distance $d_i$ to enable comfortable viewing of object 400.

Figure 4B:
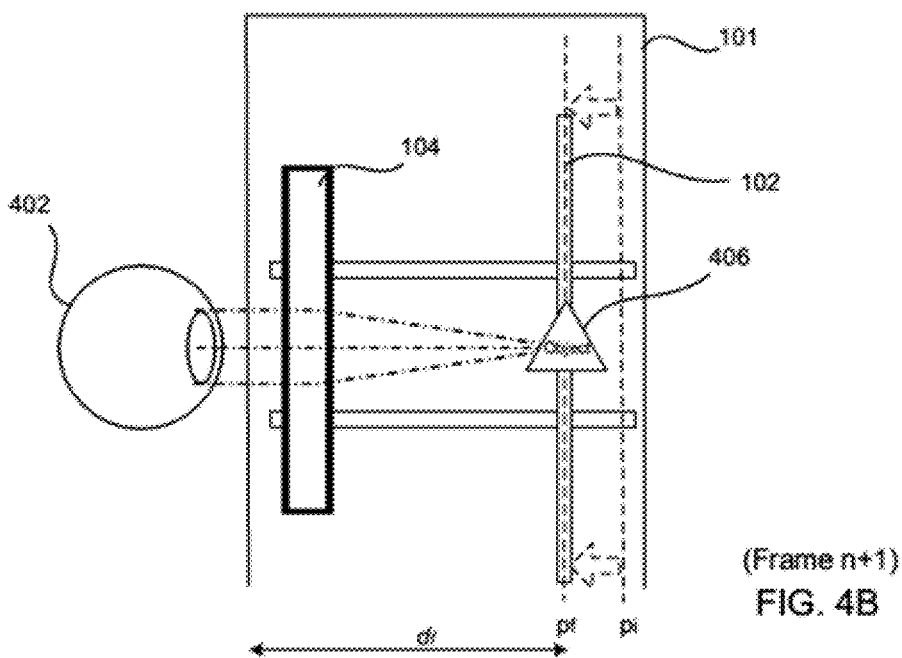

FIG. 4B shows display device 101 providing focal plane adjustment for a subsequent frame n+1 of the virtual scene. In this example, user 402 may have repositioned his or her eyes to look at object 406 or object 406 quickly moved toward user 402 in the scene. As a result, the virtual image of object 406 is located close to display 102. In response to the location of object 406 being close to the display 102, which is closer than object 400 in FIG. 4A, eyes of user 402 rotate inward to verge on object 406, causing vergence processing module 112 to determine a new vergence depth for frame n+1 and to provide the new vergence depth to varifocal actuation block 106. Based on the new vergence depth, varifocal actuation block 106 moves display 102 from position $p_i$ to new position $p_j$ to accommodate user 402 at the new vergence depth $d_f$ for the closer object 406.

In some embodiments, each state of optics block 104 corresponds to a combination of a particular focal distance and a particular eye position. In some examples, optics block 104 is configured to provide accommodation for a range of vergence depths. In some embodiments, each state of optics block 104 is associated with a specific position of optics block 104. Accordingly, vergence depths may be mapped to positions of optics block 104, and, in some cases, the mapping information is stored in a table (e.g., a lookup table). Thus, in some embodiments, when a vergence depth is received from vergence processing module 112, varifocal actuation block 106 moves optics block 104 to a position corresponding to the received vergence depth based on the lookup table.

In many instances, virtual reality systems aim to present users with a virtual environment that closely simulates a real world environment, causing the users to get immersed in the environment presented by the virtual reality systems. To provide users with a realistic or captivating virtual environment, a virtual reality system implements multiple systems and methods discussed herein to operate together at efficiencies that are imperceptible to a user. For example, transition delays are particularly costly to user experience with virtual reality systems. If a user is waiting for the virtual scene presented by a HMD to catch up to what the user's brain is already expecting, the quality of the immersive experience is reduced.

In some embodiments, the frame of the virtual scene corresponding to the portion of the virtual scene being viewed by the user is displayed on display 102 with a distortion correction to correct optical error caused by optics block 104 based on the determined state of optics block 104 and a depth of field blur based on the vergence depth. Further, varifocal actuation block 106 has changed the focus of optics block 104 to provide focus and accommodation to the location in the portion of the virtual scene where the user's eyes are verged.

In some embodiments, display of a scene by display device 101 is modified to mitigate distortion introduced by optical errors of optics block 104 included in display device 101 that directs image light from display element 102 presenting the scene to an eye of a user. A distortion correction is applied to the scene that pre-distorts the scene, and distortion caused by optics block 140 compensates for the pre-distortion as light from the modified scene passes through optics block 104 (or the pre-distortion compensates for the distortion caused by optics block 140). Hence, the scene viewed by the user is not distorted. Accordingly, distortion corrections account for different levels and types of distortion caused by different eye positions relative to optics block 104 or different focal distances of display device 101. Accordingly, the distortion corresponding to different potential eye positions relative to optics block 104 and at potential focal distances for display device 101 is determined by measuring a wavefront (i.e., propagation of points of the same phase) of light from display 102 after the light has passed through optics block 104. Different eye positions relative to optics block 104 and different states of optics block 104 cause different degrees of optical error in light directed through optics block 104. This optical error distorts light from display 102 included in display device 101, which may impair presentation of a virtual scene to a user. Accordingly, distortion correction maps are generated based on measurements of the wavefront for different states of optics block 104 to correct for optical error introduced by the different states of optics block 104, which accounts for different focal distances of display device 101.

Figure 4C:
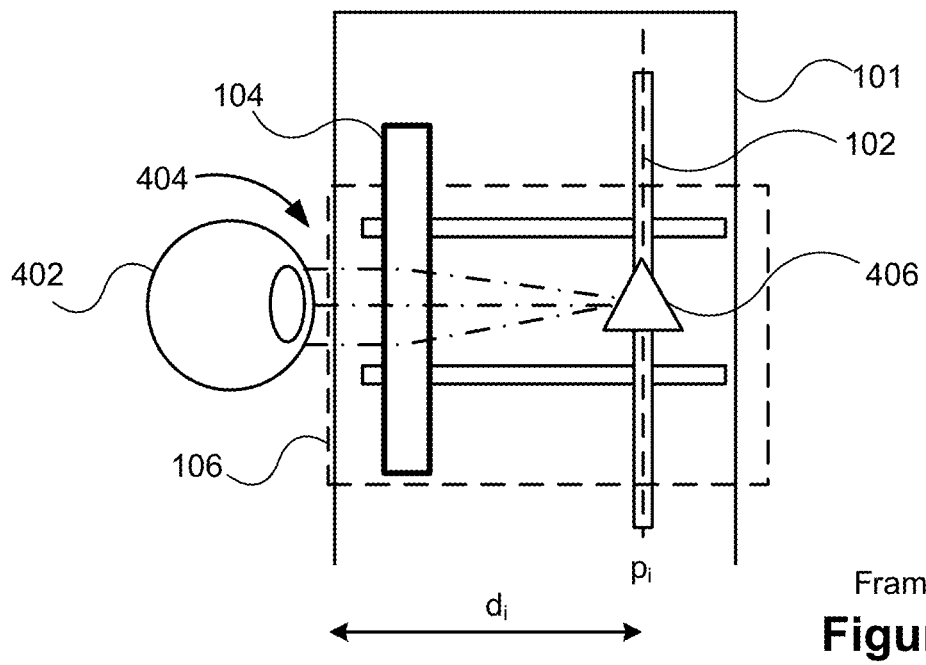
Figure 4D:
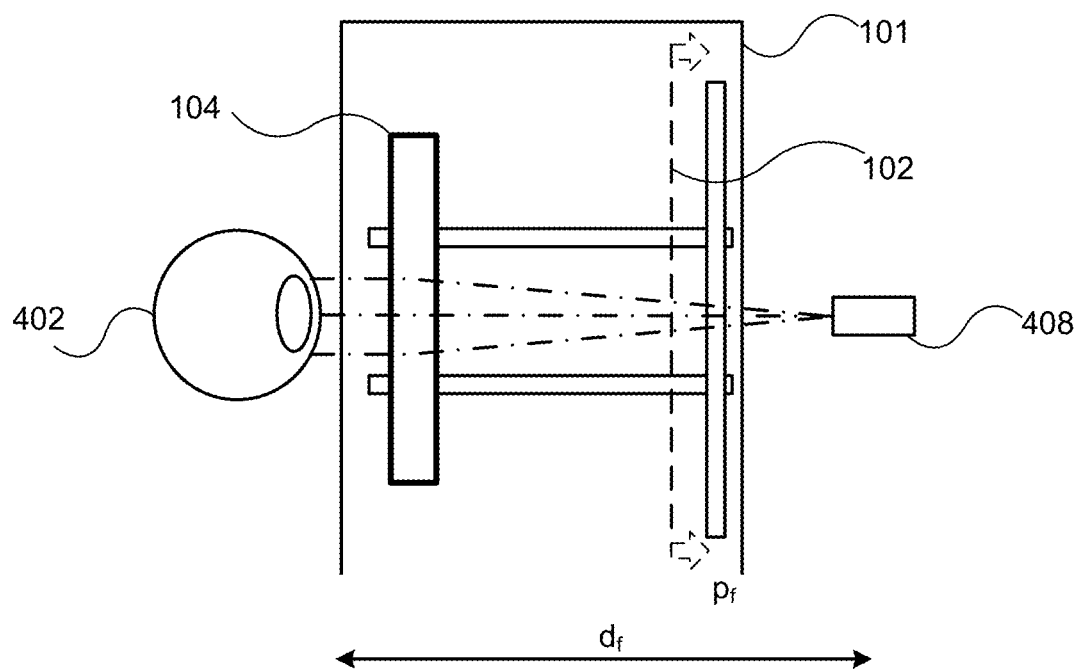

FIGS. 4C-4D show adjusting the focal plane by moving display 102 (e.g., away from user 402) while optics block 104 maintains its position. Alternatively, display device 101 adjusts the focal plane by moving display 102 closer to user 402 while optics block 104 maintains its position. In some embodiments, display device 101 adjusts the focal plane by moving optics block 104 while display 102 maintains its position. Thus, although the focal plane can be adjusted by moving both optics block 104 and display 102 as shown in FIGS. 4A-4B, it is not necessary to move both optics block 104 and display 102 for adjusting the focal plane.

Varifocal Actuation

As described above, varifocal actuation block 106 enables dynamic adjustment of the focal plane of display device 101 to keep a user's eyes in a zone of comfort as vergence and accommodation change. In some embodiments, varifocal actuation block 106 physically changes the distance between display 102 and optics block 104 by moving display 102 or optics block 104 (or both). Moving or translating two lenses that are part of optics block 104 relative to each other may also be used to change a focal distance of optics block 104 of display device 101, which, in turn, changes the focal plane. As discussed in more detail below with reference to FIG. 7, in some embodiments, varifocal actuation block 106 physically changes the distance between display 102 and optics block 104 after display device 101 receives information from application engine 156.

A varifocal system provides dynamic adjustment of the focal distance of a head mounted display (HMD) to keep a user's eyes in a zone of comfort as vergence and accommodation change. The system uses an eye tracker to determine a vergence depth corresponding to where the user is looking and adjusts the focus to ensure a displayed image is in focus at the determined focal plane. The system, in one implementation, physically changes the distance between an electronic display and optical block of the HMD by moving the electronic display, optical block, or both using various actuation devices, guidance system, and encoder mechanisms described herein.

Figure 5A:
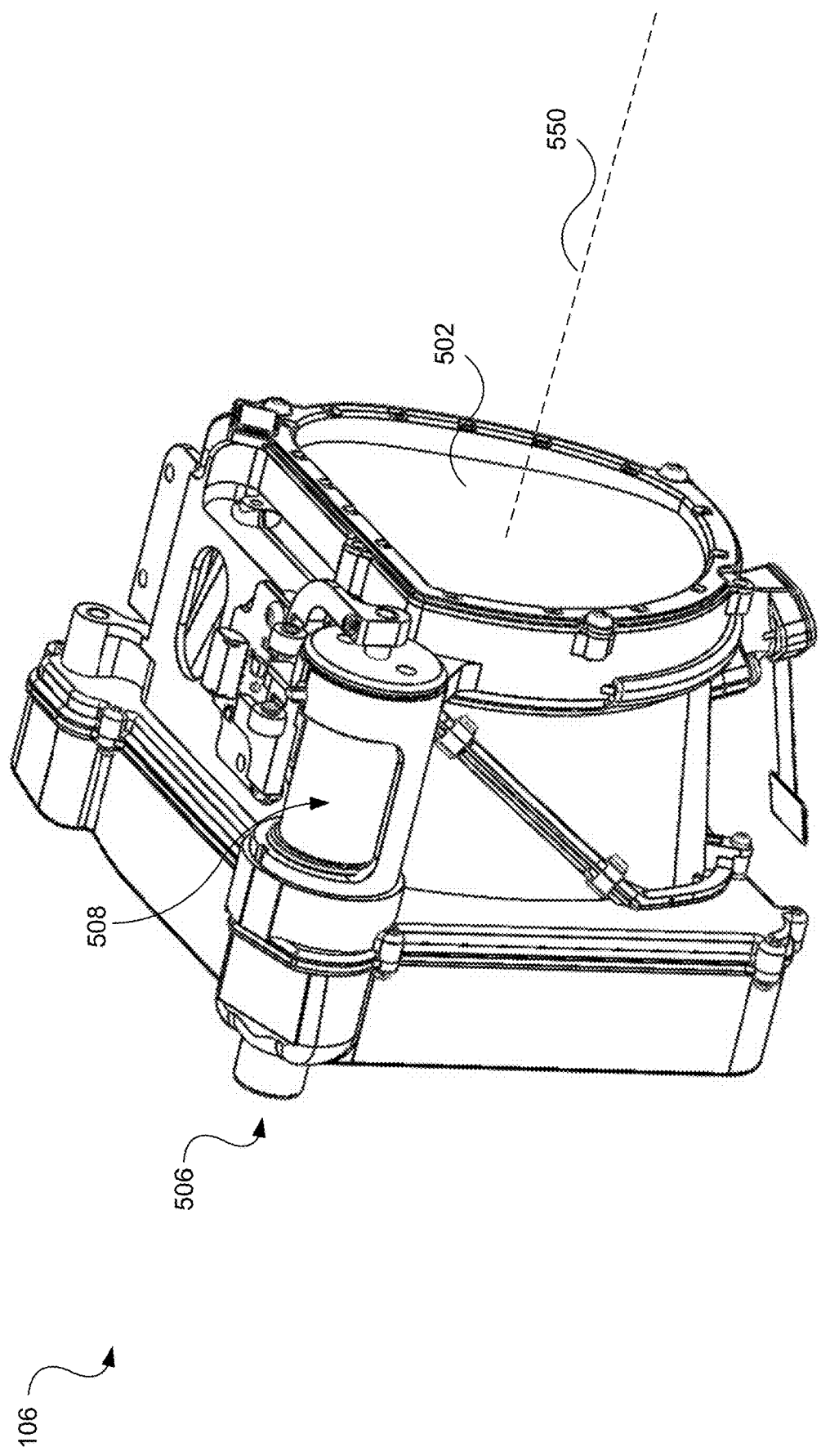
FIGS. 5A-5C show a varifocal actuation block that includes a voice coil motor in accordance with some embodiments.
Figure 5B:
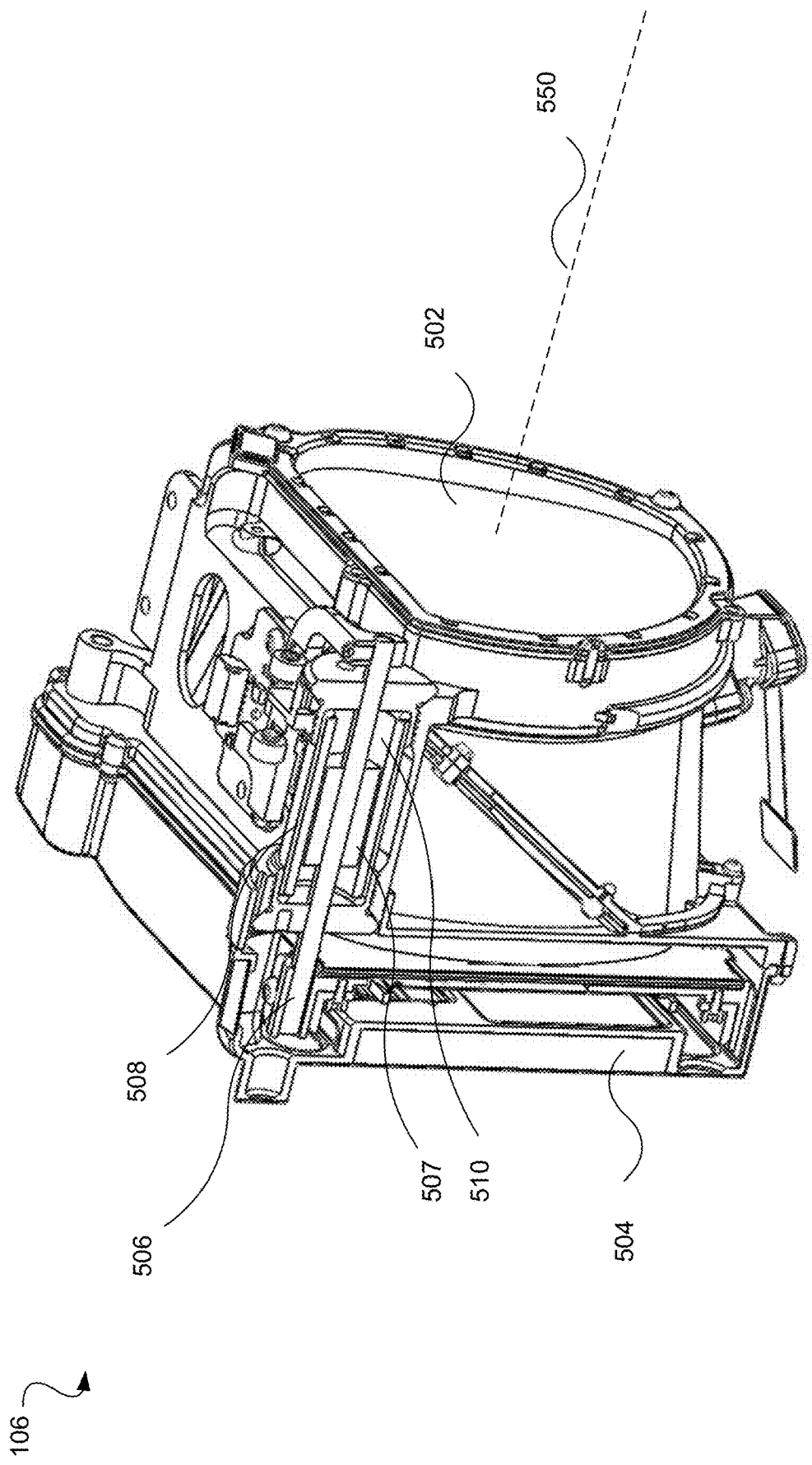
Figure 5C:
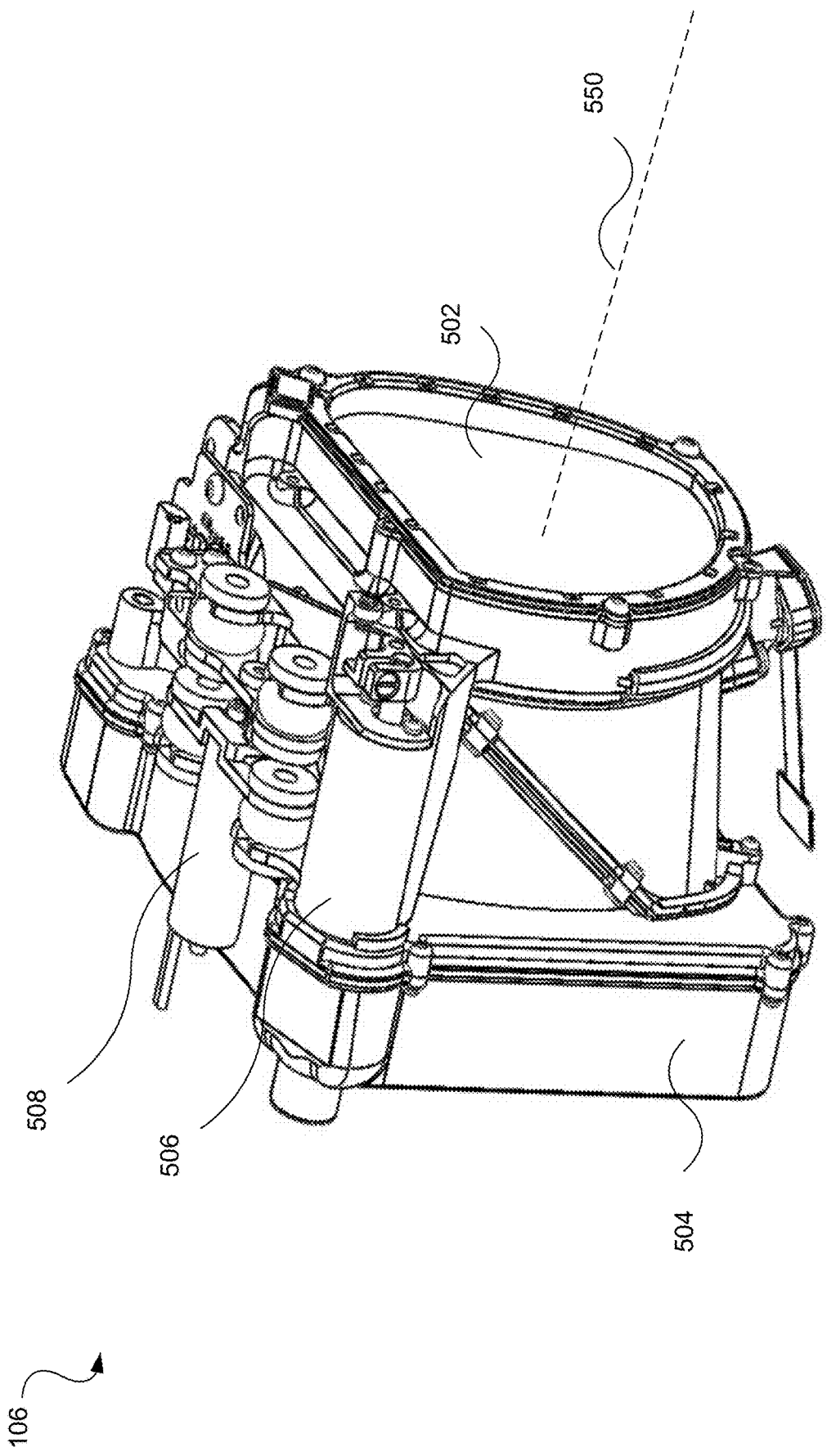

FIGS. 5A-5C show varifocal actuation block 106 in accordance with some embodiments. Each view of FIGS. 5A-5C includes optics block 104 and varifocal actuation block 106 for a single eye of a user. In practice, display device 101 would include two such portions (e.g., display device 101 would include two displays 102, two optical blocks 104, and two varifocal actuation blocks 106). It is noted that in some embodiments, however, display device 101 may include a single display 102 and one or more varifocal actuation blocks 106.

One skilled in the art will appreciate that voice coil motors are used by directing a current through the coil to produce a magnetic field. The magnetic field produced by the electric current produces a force along its length. An example of voice coil motors is voice coil linear motors.

FIG. 5A is a perspective view of varifocal actuation block 106 in accordance with some embodiments. Varifocal actuation block 106, in some embodiments, includes voice coil motor 508 and guide 506. In some embodiments, voice coil motor 508 is slidingly coupled to guide 506 along the optical axis, and guide 506 is positioned substantially parallel to the optical axis. Voice coil motor 508 is used to move electronic display 102 (shown in FIG. 6B) toward and away from optics block 104 (e.g., lens 502) along an optical axis (e.g., optical axis 550, FIG. 5A-5C) via one or more guides 506. In some embodiments, when electronic display 102 moves along the optical axis, the electronic display 102 may also move in a direction that is perpendicular to the optical axis. In some embodiments, when electronic display 102 moves along the optical axis, the electronic display 102 does not move in a direction that is perpendicular to the optical axis.

FIG. 5B is a partial cross-sectional view of varifocal actuation block 106 shown in FIG. 5A. FIG. 5B shows display 102 (e.g., display 504, a light-emitting diode display, an organic light-emitting diode display, etc.) coupled to varifocal actuation block 106. As described above, the position of electronic display 102, at least in some embodiments, is driven by (or adjusted in response to) the focal plane corresponding to a vergence depth determined from the vergence angle of the user's eyes, which is obtained from real-time eye tracking. The position of an eye may be captured by camera 302. Accordingly, voice coil motor 508 may move electronic display 102 toward and away from optics block 104 (e.g., lens 502) along the optical axis based on the real-time eye tracking.

FIG. 5B also shows guide 506, which is configured to guide movement of display 102 relative to optics block 104. For example, guide 506 constricts the movement of display 102 to a particular axis (e.g., guide 506 constricts the movement of display 102 to an optical axis of optics block 104 so that display 102 can move toward or away from optics block 104 but cannot move in a direction perpendicular to the optical axis of optics block 104). Although not shown, display device 101 may include multiple guides 506. Typically, multiple guides 506 are positioned parallel to one another.

FIG. 5B further illustrates voice coil motor 508 positioned in-line with guide 506. Voice coil motor 508 includes coil 510 slidingly coupled with magnet 507. In some embodiments, guide 506 is mechanically coupled with the magnet 507 as shown in FIG. 5B (e.g., guide 506 moves relative to coil 510). In some embodiments, guide 506 is mechanically coupled with coil 510 (e.g., guide 506 moves relative to magnet 507).

FIG. 5C is a perspective view of varifocal actuation block 106 in accordance with some embodiments. Varifocal actuation block 106, in some embodiments, includes voice coil motor 508 and guide 506. FIG. 5C shows voice coil motor 508 positioned at the top of lens 502. In some embodiments, voice coil motor 508 is positioned substantially parallel to guide 506.

Figure 6:
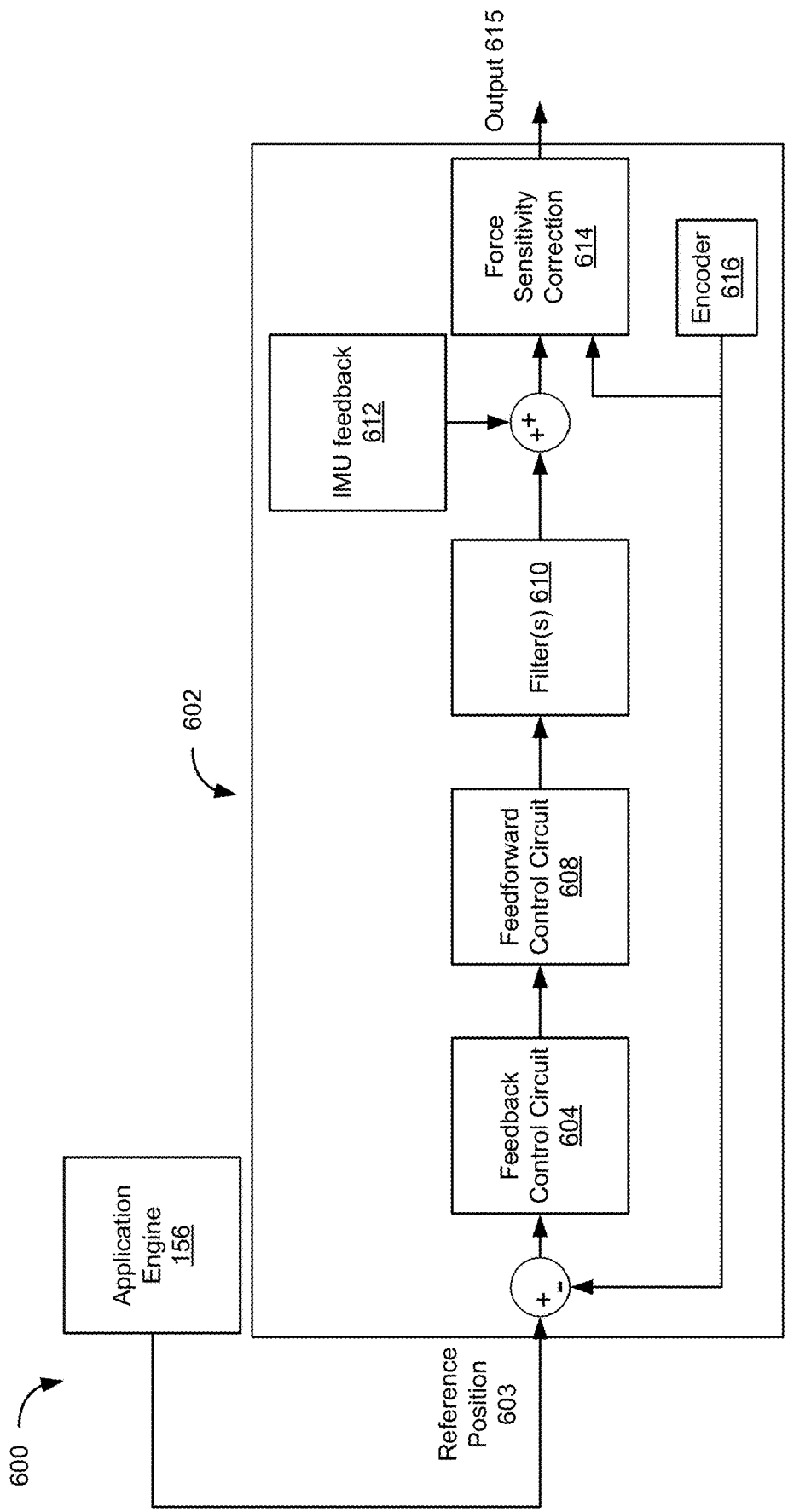
FIG. 6 is a block diagram illustrating a control system for controlling the operation of a voice coil motor in accordance with some embodiments.

FIG. 6 is a block diagram for a controlling system for a voice coil motor in accordance with some embodiments. Block diagram 600 includes application engine 156 (e.g., application engine 156 of console 150, FIG. 1), feedback control circuit 604, feedforward control circuit 608, one or more filters 610, IMU feedback 612, force sensitivity correction 614 (e.g., force sensitivity correction module 126, FIG. 1), and output voltage 615. Controller 602 includes feedback control circuit 604, feedforward control circuit 608, filter(s) 610, IMU feedback 612, and force sensitivity correction 614.

Feedback control circuit 604 is configured to determine the difference between a current (actual) position (e.g., position $p_i$, FIG. 4A) and a new (reference) position (e.g., position pf, FIG. 4B). In some embodiments, feedback control circuit 604 determines the actual position of electronic display 102 based on a current position of voice coil motor (e.g., voice coil motor 508, FIG. 5A-B). In some embodiments, feedback control circuit 604 is a proportional-integral-derivative (PID) controller, or the like.

Alternatively, or in addition, in some embodiments, feedback control circuit 604 determines the actual position of display 102 (and/or optics block 104) based on information from one or more position sensors (e.g., position sensors 124, FIG. 1). As explained above with reference to FIG. 1, position sensors may be used to determine a position of display 102 (i.e., provide positioning feedback). In some embodiments, one or more position sensors continuously sends the position of display 102 to feedback control circuit 604. Alternatively, one or more position sensors may send the position of display 102 to feedback control circuit 604 at predefined intervals or in response to a request from feedback control circuit 604.

In some embodiments, feedback control circuit 604 also receives the new (reference) position 603 of display 102 (e.g., position pf) from application engine 156. In response, feedback control circuit 604 is configured to determine a difference, if any, between the actual position of display 102 and the reference position. The output of feedback control circuit 604 is fed into feedforward control circuit 608.

In some embodiments, an eye tracking system configured to determine a position of an eye of a user may determine the reference position 603 and provide the reference position to the feedback control circuit 604.

In some embodiments, feedforward control circuit 608 (e.g., directional feedforward circuit) is configured to predict the effects of the disturbances on the system. For example, feedback control circuit 604 signals feedforward control circuit 608 to increase the voltage to the voice coil motor and feedforward control circuit 608 generates a positive voltage constant.

One or more filters 610 are used to smooth the process. One or more filters 610 may include a voltage limiter to control the acceleration of voice coil motor 508 and/or to protect the circuit from exceeding a predetermined value.

In some embodiments, inertial measurement unit (IMU) feedback 612 data is used in the closed feedback loop control system to aid the controller in compensating for movements such as acceleration of the head, by the user. For example, a user may turn his/her head to the right or left while changing the focal point on the display of the HMD. In such a case, the IMU (e.g., IMU 116, FIG. 1) uses the data collected to compensate for the signal sent to the voice coil motor. The signal may need to be adjusted to be stronger or weaker, depending on how much force correction is required based on the user's movements.

Force sensitivity correction 614 is to compensate for voice coil motor's intrinsic force sensitivity coefficient. This module is discussed in more detail below with reference to FIG. 7C. Encoder 616 is to convert data inputs into an encoded output.

Figure 7A:
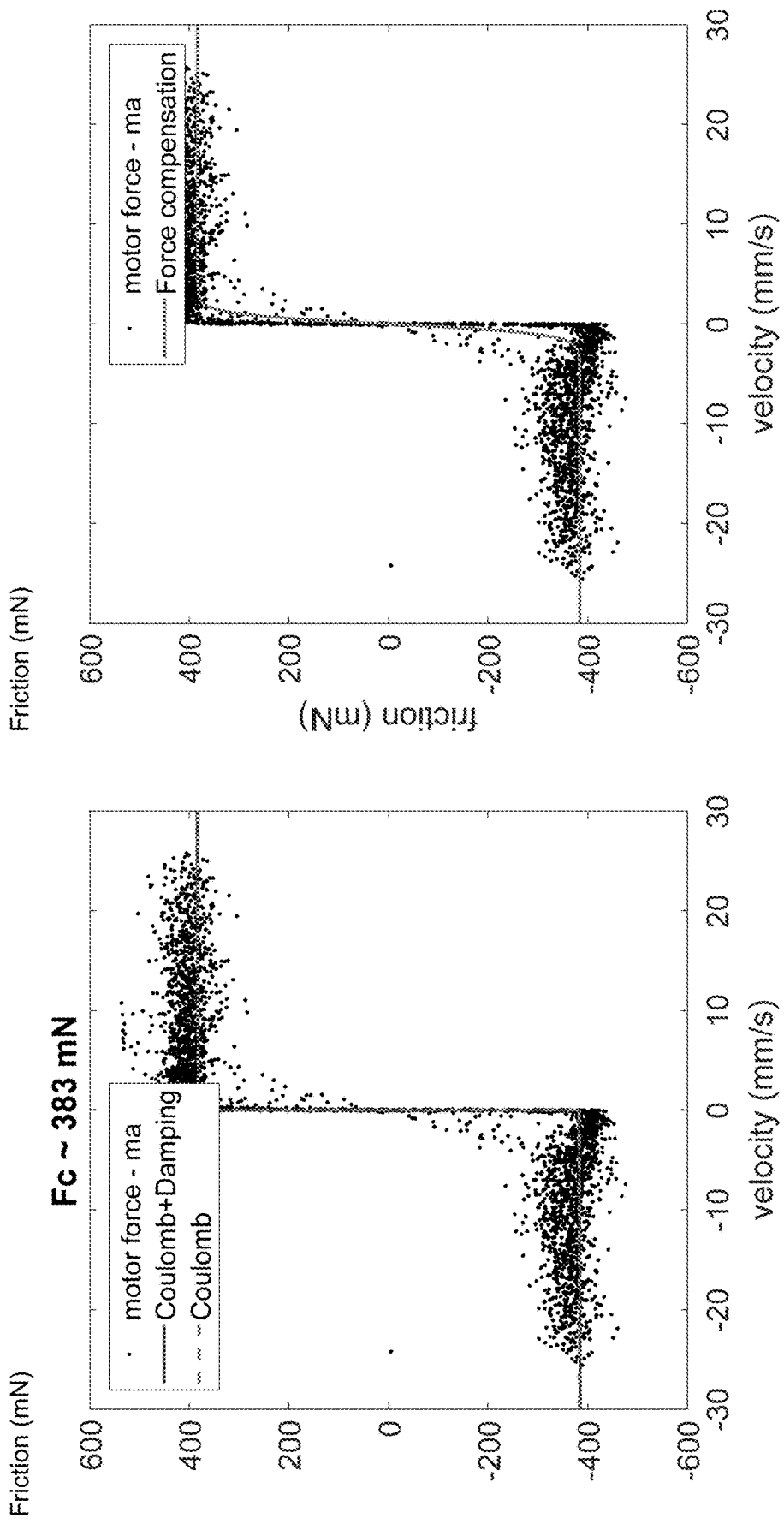
FIG. 7A shows a graph illustrating an operation of a feedforward control circuit in accordance with some embodiments.

FIG. 7A shows a graph illustrating an operation of a feedforward control circuit in accordance with some embodiments. The graph on the left estimates the friction from the recorded voltage and position. The graph on the right shows a friction compensation curve. In some embodiments, feedforward control circuit may be directional feedforward, friction compensation, etc.

As shown in FIG. 6, feedforward control circuit 614 is configured to compensate for friction (e.g., stick-slip) of the voice coil motor. To compensate for friction, the feedforward control circuit 614 is configured to output more or less force as determined by the output of feedback control circuit 604. In some embodiments, feedforward control circuit 614 is used as friction compensation. The feedforward control circuit 614 is configured to receive real-time estimation of the velocity and/or other sensor data (e.g., data from position sensors 124, head tracking sensors 118).

Figure 7B:
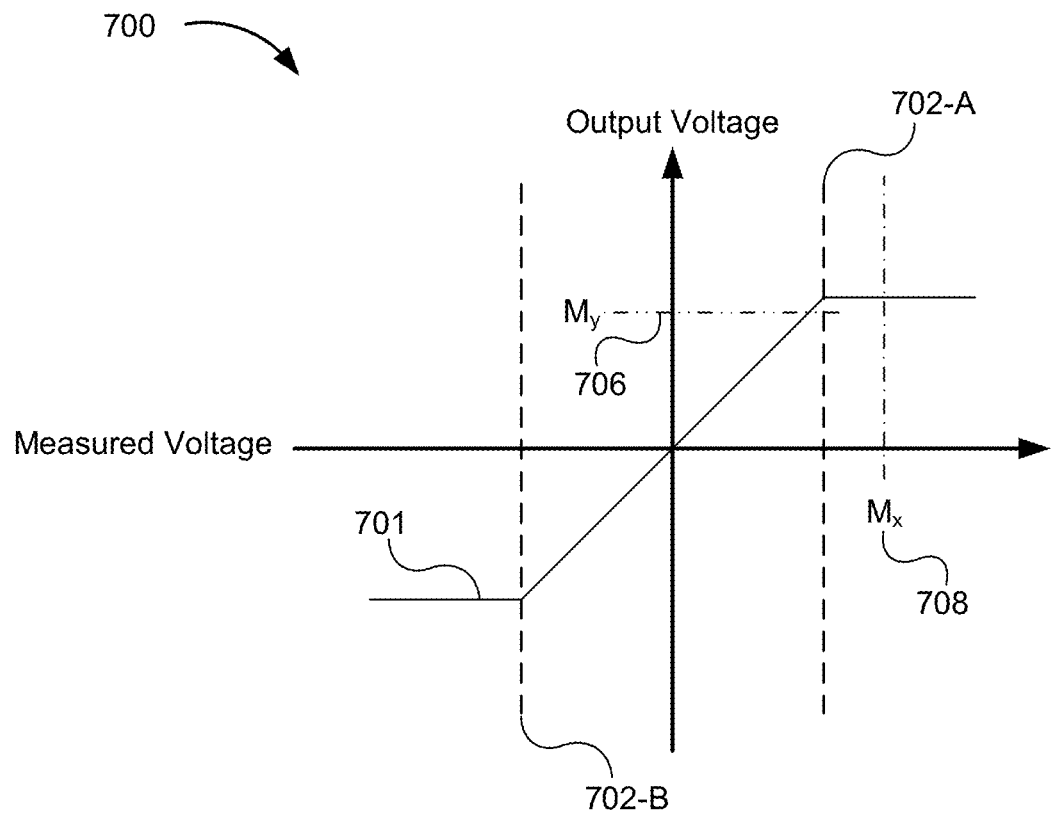
FIG. 7B shows a graph illustrating an operation of an example filter in accordance with some embodiments.

FIG. 7B shows a graph illustrating an operation of an example filter in accordance with some embodiments. Graph 700 includes measured voltage on its x-axis and output current on its y-axis. Graph 700 includes voltage distribution 701 and voltage thresholds 702-A and 702-B. As shown in FIG. 6, measured voltage Mx 708 satisfies (e.g., exceeds) voltage threshold 702-A, and as a result, display device 101 (or a component thereof such as controller 602, FIG. 6) reduces a magnitude of voltage (to voltage threshold 702-A or a fraction thereof) in response to determining that the measured voltage satisfies voltage threshold 702-A. For example, display device 101 reduces the magnitude of the measured current to magnitude My 706, which corresponds to a fraction of the voltage threshold (e.g., 90% or 80% of the current threshold). The voltage of the reduced magnitude is output from the filter. This prevents or reduces the possibility of over-accelerating or even burning out voice coil motor 508 caused by a voltage/current spike.

Figure 7C:
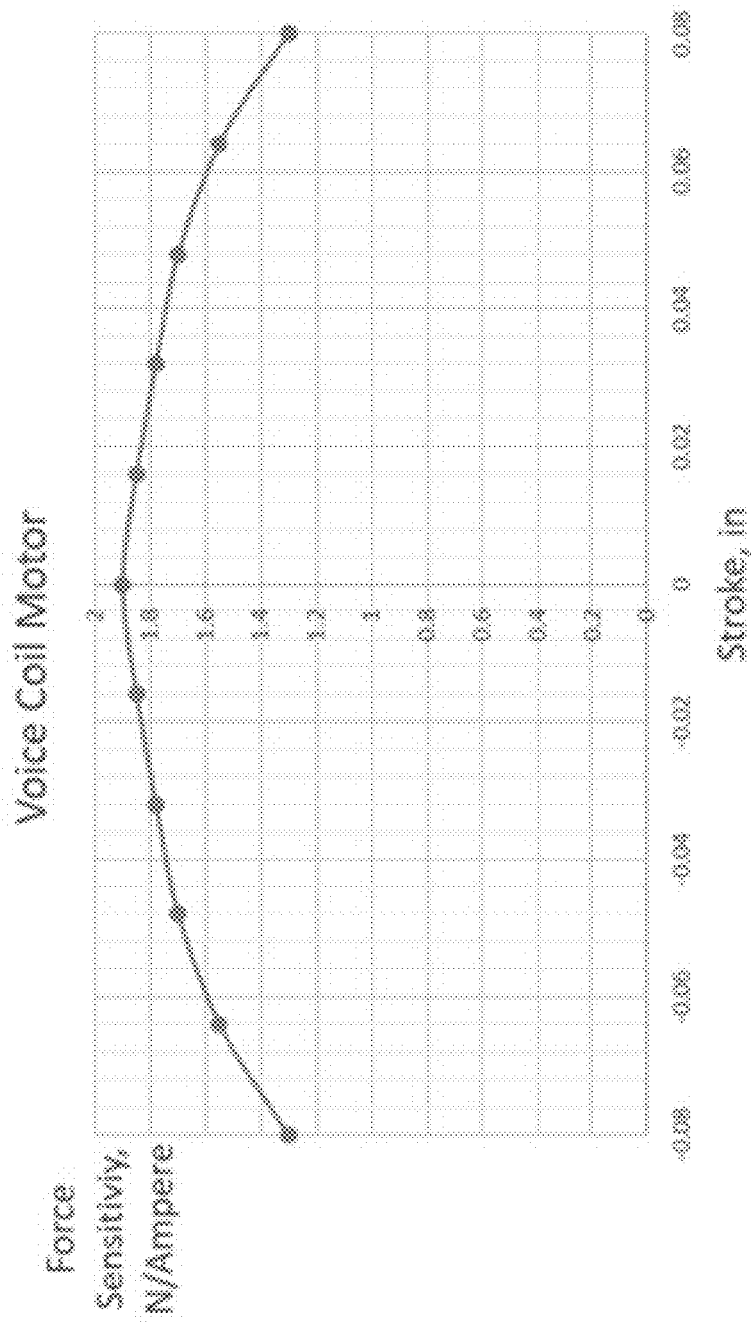
FIG. 7C shows a graph illustrating an operation of a force sensitivity correction circuit in accordance with some embodiments.

FIG. 7C shows a graph illustrating an operation of a force sensitivity correction circuit in accordance with some embodiments.

As mentioned above, voice coil motor 508 includes an intrinsic force sensitivity coefficient. To operate voice coil motor 508, a voltage is applied to drive current through coils in a magnetic field to generate an electro-magnetic field. This phenomenon is governed by the Lorentz Force Principle. The magnitude of the electro-magnetic field can be determined by:

$$F = kBLIN$$

F=Force, k=constant, B=magnetic flux density, L=length of conductor, I=current, and N=number of conductors.

The force generated upon the coil when current flows through produces relative motion between the electro-magnetic field and the coil. However, the force must be great enough to overcome intrinsic friction, inertia, gravity, and other forces.

FIG. 7C shows that the force sensitivity correction circuit achieves maximum force when magnet is in the center of voice coil motor 508.

The inherent voice coil force sensitivity coefficient can be determined by:

$$K_f(x) = -c_f x(t)^2 + K_{f0}$$

where Kf is the force sensitivity coefficient of the voice coil motor. As discussed above, the nonlinear force sensitivity correction circuit is configured to compensate for the inherent force sensitivity coefficient of the motor.

FIGS. 8A-8B show a method of adjusting positions of an electronic display in accordance with some embodiments.

In some embodiments, one or more operations of method 800 (FIGS. 8A-8B) are performed by an electronic controller (e.g., controller 602, FIG. 6) of display device 101 (802). The display device (e.g., head-mounted display device) includes a first set of one or more lenses defining a first optical axis (e.g., lens 605, FIG. 6), a first display configured to project light through the first set of the one or more lenses (e.g., display 102, FIG. 1), a first voice coil actuator coupled with the first display and configured to move the first display along the first optical axis (e.g., voice coil motor 508, FIG. 5A), a first guide (e.g., guide 506, FIG. 5A) that is slidingly coupled with the first voice coil actuator to guide the movement of the first display, a first set of one or more position sensors configured to determine a position of the first display along the first optical axis, and a first electronic controller (e.g., controller 602, FIG. 6) configured to receive information identifying a first reference position of the first display along the first optical axis, receive information identifying the determined position of the first display along the first optical axis, and generate one or more electrical signals for initiating a movement of the first display toward the first reference position along the first optical axis.

In some embodiments, the first voice coil actuator includes a coil and a magnet that is slidingly coupled with the coil and the first display is mechanically coupled with the magnet. In some embodiments, the first display is directly coupled with the magnet. In some embodiments, the first display is indirectly coupled with the magnet.

In some embodiments the first voice coil includes a coil and a magnet that is slidingly coupled with the coil and the first display is mechanically coupled with the coil. In some embodiments, the first display is directly coupled with the coil. In some embodiments, the first display is indirectly coupled with the coil.

In some embodiments, the first voice coil includes a coil and a magnet that is slidingly coupled with the coil and the first guide includes a shaft that is mechanically coupled with the magnet. In some embodiments, the first guide includes a shaft that is mechanically coupled with the coil.

In some embodiments, the first guide includes a shaft that is mechanically coupled with the magnet.

Method 800 includes receiving (804) information identifying a first reference position of a first display along a first optical axis. In some embodiments, the controller determines (806) the first reference position based on information identifying a position of an eye of a user by an eye tracking system and provide the first reference position to the first electronic controller.

In some embodiments, the first electronic controller receives (808) information identifying a determined position of the first display along the first optical axis.

In some embodiments, the first electronic controller generates (810) one or more electrical signals for initiating a movement of the first display toward the reference position along the first optical axis. In some embodiments, the first electronic controller generates (812) a first electrical signal that is based on a difference between the first reference position along the first optical axis and the determined position of the first display along the first optical axis.

In some embodiments, the first electronic controller generates (814) one or more electrical signals that are based on a derivative value corresponding to the difference between the first reference position along the first optical axis and the determined position of the first display along the first optical axis and/or an integral value corresponding to the difference between the first reference position along the first optical axis and the determined position of the first display along the first optical axis. In some embodiments, the first electronic controller generates (816) a second electrical signal by adding to the first electrical signal a predefined amount of signal based on a sign of the first electrical signal.

In some embodiments, the first voice coil actuator includes a coil and a magnet. In some embodiments, the coil and the magnet are slidingly coupled with each other. In some embodiments, one of the coil and the magnet is coupled with the first display and the other of the coil and the magnet is coupled with a housing of the first voice coil actuator. In some embodiments, the first electronic controller generates (818) a third electrical signal that is based on (i) the difference between the first reference position along the first optical axis and the determined position of the first display along the optical axis and (ii) a position of the coil relative to the magnet. In some embodiments, the first electronic controller is configured to determine the position of the coil relative to the magnet based on the determined position of the first display along the first optical axis.

In some embodiments, the first electronic controller generates (820) a fourth electrical signal by limiting the first electrical signal and/or limiting a rate of change of the first electrical signal. For examples, if the first electrical signal is greater than a predefined signal threshold, the first electronic controller generates an electrical signal that corresponds to the predefined signal threshold. In another example, if the first electrical signal has changed at a rate greater than a predefined change rate limit, the first electronic controller generates an electrical signal that has changed by the predefined change rate limit. In some embodiments, the first electronic controller generates (822) a fifth electrical signal by adding to the first signal an electrical signal based on an acceleration of the head-mounted display determined by one or more inertial measurement units of the head-mounted display.

In some embodiment, the first electronic controller repeats (824) receiving the information identifying a determined position of the first display along the optical axis and providing electrical signals to continue the movement of the first display until the determined position is within a predefined distance from the first reference position. In some embodiments, the first electronic controller smooths (826) electrical signals representing the determined position of the first display along the first optical axis using a filter that is electrically coupled to the first set of one or more position sensors and the first controller.

In some embodiments, the head-mounted display includes a second set of one or more lenses defining a second optical axis (not shown), and a second display (e.g., display 102, FIG. 4B) configured to project light through the second set of one or more lenses (e.g., an instance of lens 605, FIG. 6). The head-mounted display additionally includes a second voice coil actuator coupled with the second display and configured to move the second display along the second optical axis, and a second guide that is separate from the second voice coil actuator and slidingly coupled with the second voice coil to guide the movement of the second display. The second guide may be positioned substantially parallel to the second optical axis. Additionally, the head-mounted display includes a second set of one or more position sensors configured to determine a position of the second display along the second optical axis and a second electronic controller configured to receive information identifying a second reference position of the second display along the second optical axis, receive information identifying the determined position of the second display along the second optical axis, and initiate a movement of the second display toward the second reference position along the second optical axis.

Accordingly, the second electronic controller can also perform the steps of method 800 in conjunction with the first electronic controller. In this way, the head-mounted display device includes two displays that can be moved together.

What is claimed is:

1. A head-mounted display device, comprising:
a first set of one or more lenses defining a first optical axis;
a first display configured to project light through the first set of one or more lenses;
a first voice coil actuator coupled with the first display and configured to move the first display along the first optical axis;
a first guide that is slidingly coupled with the first voice coil actuator to guide the movement of the first display;
a first set of one or more position sensors configured to determine a position of the first display along the first optical axis; and
a first electronic controller configured to receive information identifying a first reference position of the first display along the first optical axis, receive information identifying the determined position of the first display along the first optical axis, and generate one or more electrical signals for initiating a movement of the first display toward the first reference position along the first optical axis, wherein the first electronic controller is configured to generate a first electrical signal of the one or more electrical signals that is based on a difference between the first reference position along the first optical axis and the determined position of the first display along the first optical axis, the determined position being determined by the first set of one or more position sensors.

2. The device of claim 1, wherein:
the first voice coil actuator includes a coil and a magnet that is slidingly coupled with the coil; and
the first display is mechanically coupled with the magnet.

3. The device of claim 1, wherein:
the first voice coil actuator includes a coil and a magnet that is slidingly coupled with the coil; and
the first display is mechanically coupled with the coil.

4. The device of claim 1, wherein:
the first voice coil actuator includes a coil and a magnetic that is slidingly coupled with the coil; and
the first guide includes a shaft that is mechanically coupled with the magnet.

5. The device of claim 1, wherein:
the first voice coil actuator includes a coil and a magnetic that is slidingly coupled with the coil; and
the first guide includes a shaft that is mechanically coupled with the coil.

6. The device of claim 1, wherein:
the first electronic controller is configured to repeat (i) receiving information identifying a determined position of the first display along the first optical axis and (ii) providing electrical signals to continue the movement of the first display until the determined position is within a predefined distance from the first reference position.

7. The device of claim 6, including:
a filter that is electrically coupled to the first set of one or more position sensors and the first electronic controller, the filter configured to smooth electrical signals representing the determined position of the first display along the first optical axis.

8. The device of claim 1, wherein:
the first electronic controller is configured to generate one or more electrical signals that are based on a derivative value corresponding to the difference between the first reference position along the first optical axis and the determined position of the first display along the first optical axis and/or an integral value corresponding to the difference between the first reference position along the first optical axis and the determined position of the first display along the first optical axis.

9. The device of claim 1, wherein:
the first electronic controller is configured to generate a second electrical signal by adding to the first electrical signal a predefined amount of signal, the predefined amount of signal having a positive voltage when the first electrical signal has a positive voltage and the predefined amount of signal having a negative voltage when the first electrical signal has a negative voltage.

10. The device of claim 1, wherein:
the first electronic controller is configured to generate a fourth electrical signal by limiting the first electrical signal and/or limiting a rate of change of the first electrical signal.

11. The device of claim 1, including:
one or more inertial measurement units configured to determine an acceleration of the head-mounted display device; and
the first electronic controller is configured to generate a fifth electrical signal by adding to the first electrical signal an electrical signal based on the acceleration of the head-mounted display device.

12. The device of claim 1, further comprising:
an eye tracking system configured to determine a position of an eye of a user; and
one or more processors configured to determine the first reference position based on information identifying the determined position of the eye of the user and provide the first reference position to the first electronic controller.

13. The device of claim 1, further comprising:
a second set of one or more lenses defining a second optical axis;
a second display configured to project light through the second set of one or more lenses;
a second voice coil actuator coupled with the second display and configured to move the second display along the second optical axis;
a second guide that is separate from the second voice coil actuator and slidingly coupled with the second voice coil actuator to guide the movement of the second display;
a second set of one or more position sensors configured to determine a position of the second display along the second optical axis; and
a second electronic controller configured to receive information identifying a second reference position of the second display along the second optical axis, receive information identifying the determined position of the second display along the second optical axis, and initiate a movement of the second display toward the second reference position along the second optical axis.

14. A head-mounted display, comprising:
a first set of one or more lenses defining a first optical axis;
a first display configured to project light through the first set of one or more lenses;
a first voice coil actuator coupled with the first display and configured to move the first display along the first optical axis;
a first guide that is slidingly coupled with the first voice coil actuator to guide the movement of the first display;
a first set of one or more position sensors configured to determine a position of the first display along the first optical axis; and
a first electronic controller configured to receive information identifying a first reference position of the first display along the first optical axis, receive information identifying the determined position of the first display along the first optical axis, and generate one or more electrical signals for initiating a movement of the first display toward the first reference position along the first optical axis, wherein:
the first voice coil actuator includes a coil and a magnet; and
the first electronic controller is configured to generate a first electrical signal of the one or more electrical signals that is based on (i) a difference between the first reference position along the first optical axis and the determined position of the first display along the first optical axis and (ii) a position of the coil relative to the magnet.

15. A first electronic controller configured for use in a head-mounted display device, the controller comprising:
one or more processors; and
memory storing one or more programs for execution by the one or more processors, the one or more programs including instructions for:
receiving information identifying a first reference position of a first display, of the head-mounted display device, along a first optical axis;
receiving, from a first set of one or more position sensors configured to determine a position of the first display along the first optical axis, information identifying a determined position of the first display along the first optical axis; and
generating one or more electrical signals for initiating a movement of the first display toward the first reference position along the first optical axis, wherein generating the one or more electrical signals includes generating a first electrical signal that is based on a difference between the first reference position along the first optical axis and the determined position of the first display along the first optical axis, the determined positioned being determined by the first set of one or more position sensors.

16. A non-transitory computer readable storage medium storing one or more programs for execution by a first electronic controller, the one or more programs including instructions for:
receiving information identifying a first reference position of a first display of a head-mounted display device, along a first optical axis;
receiving, from a first set of one or more position sensors configured to determine a position of the first display along the first optical axis, information identifying a determined position of the first display along the first optical axis; and
generating one or more electrical signals for initiating a movement of the first display toward the first reference position along the first optical axis, wherein generating the one or more electrical signals includes generating a first electrical signal that is based on a difference between the first reference position along the first optical axis and the determined position of the first display along the first optical axis, the determined positioned being determined by the first set of one or more position sensors.

17. The computer readable storage medium of claim 16, wherein the one or more programs include instructions for generating a second electrical signal by adding to the first electrical signal a predefined amount of signal, the predefined amount of signal having a positive voltage when the first electrical signal has a positive voltage and the predefined amount of signal having a negative voltage when the first electrical signal has a negative voltage.

18. The computer readable storage medium of claim 16, wherein:
a first voice coil actuator includes a coil and a magnet; and
the one or more programs include instructions for generating a third electrical signal that is based on (i) the difference between the first reference position along the first optical axis and the determined position of the first display along the first optical axis and (ii) a position of the coil relative to the magnet.

* * * * *

UNITED STATES PATENT AND TRADEMARK OFFICE
CERTIFICATE OF CORRECTION

| | |
|---|---|
| PATENT NO. | : 11,009,713 B1 |
| APPLICATION NO. | : 16/530893 |
| DATED | : May 18, 2021 |
| INVENTOR(S) | : Fang et al. |

It is certified that error appears in the above-identified patent and that said Letters Patent is hereby corrected as shown below:

On the Title Page

Item [57], Line 9, delete "display long the" and insert --display along the--;

In the Claims

Claim 4, Column 20, Lines 16-17, delete "and a magnetic that" and insert --and a magnet that--;

Claim 5, Column 20, Lines 21-22, delete "and a magnetic that" and insert --and a magnet that--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*